US011326680B2

(12) United States Patent
Li et al.

(10) Patent No.: US 11,326,680 B2
(45) Date of Patent: May 10, 2022

(54) HIGH STRENGTH JOINTS BETWEEN STEEL AND TITANIUM (71) Applicant: GM GLOBAL TECHNOLOGY OPERATIONS LLC, Detroit, MI (US)

(72) Inventors: Huaxin Li, Rochester Hills, MI (US); Cheonjae Bahk, Rochester, MI (US); Pete R. Garcia, Troy, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 16/655,412

(22) Filed: Oct. 17, 2019

(65) Prior Publication Data
US 2021/0116009 A1    Apr. 22, 2021

(51) Int. Cl.
| *F16H 48/40* | (2012.01) |
| *C22C 14/00* | (2006.01) |
| *C22C 38/48* | (2006.01) |
| *C22C 38/46* | (2006.01) |
| *C22C 38/44* | (2006.01) |
| *B23K 11/26* | (2006.01) |
| *B23K 11/11* | (2006.01) |
| *B23K 11/20* | (2006.01) |
| *C22C 38/04* | (2006.01) |
| *B23K 103/24* | (2006.01) |
| *F16H 48/38* | (2012.01) |

(52) U.S. Cl.
CPC ............ *F16H 48/40* (2013.01); *B23K 11/115* (2013.01); *B23K 11/20* (2013.01); *B23K 11/26* (2013.01); *C22C 14/00* (2013.01); *C22C 38/04* (2013.01); *C22C 38/44* (2013.01); *C22C 38/46* (2013.01); *C22C 38/48* (2013.01); *B23K 2103/24* (2018.08); *F16H 2048/382* (2013.01)

(58) Field of Classification Search
None
See application file for complete search history.

(56) References Cited

U.S. PATENT DOCUMENTS 5,314,106 A   5/1994 Ambroziak et al.
6,875,949 B2   4/2005 Hall
(Continued)

OTHER PUBLICATIONS

U.S. Appl. No. 16/382,473, filed Apr. 12, 2019 by GM Global Technology Operations LLC, titled "Welding of Dissimilar Materials with Features in Faying Surface.".
(Continued)

Primary Examiner — Daniel J. Schleis
(74) Attorney, Agent, or Firm — Vivacqua Crane PLLC (57) ABSTRACT

A method of joining parts, where at least one of the parts has a faying surface defining grooves therein. One of the parts is formed of a majority of titanium, and the other part is formed of a majority of iron. The method includes providing a set of opposed welding electrodes disposed on a side of each part and applying pressure to and heating the parts via the set of electrodes to form a joint between the parts. A bonded assembly includes a first part formed of a majority of titanium and a second part formed of a steel alloy. The first and second parts having a bond that includes a portion of the first part directly in contact with and attached to a portion of the second part. The parts may be a titanium-containing differential carrier case bonded to a steel gear.

12 Claims, 8 Drawing Sheets

(56) References Cited

U.S. PATENT DOCUMENTS

| | | |
|---|---|---|
| 8,963,042 B2 | 2/2015 | Sigler et al. |
| 9,731,379 B2 | 8/2017 | Sigler et al. |
| 9,839,971 B2 | 12/2017 | Schroth et al. |
| 9,908,199 B2 | 3/2018 | Karagoulis et al. |
| 9,987,705 B2 | 6/2018 | Sigler et al. |
| 9,999,938 B2 | 6/2018 | Sigler et al. |
| 9,999,939 B2 | 6/2018 | Wang et al. |
| 10,010,966 B2 | 7/2018 | Yang et al. |
| 10,052,710 B2 | 8/2018 | Sigler et al. |
| 10,058,949 B2 | 8/2018 | Carlson et al. |
| 10,166,627 B2 | 1/2019 | Sigler et al. |
| 10,245,675 B2 | 4/2019 | Sigler et al. |
| 11,084,119 B2 * | 8/2021 | Yang .................. B23K 11/20 |
| 2015/0231730 A1 | 8/2015 | Yang et al. |
| 2015/0352658 A1 | 12/2015 | Yang et al. |
| 2015/0352659 A1 | 12/2015 | Sigler et al. |
| 2016/0045978 A1 | 2/2016 | Wang |
| 2016/0279732 A1 | 9/2016 | Sigler et al. |
| 2016/0288242 A1 | 10/2016 | Sigler et al. |
| 2016/0346865 A1 | 12/2016 | Sigler et al. |
| 2017/0008118 A1 | 1/2017 | Yang et al. |
| 2017/0157697 A1 | 6/2017 | Yang et al. |
| 2017/0225262 A1 | 8/2017 | Sigler et al. |
| 2017/0225263 A1 | 8/2017 | Sigler et al. |
| 2017/0232548 A1 | 8/2017 | Carlson et al. |
| 2017/0252853 A1 | 9/2017 | Wang et al. |
| 2017/0282303 A1 | 10/2017 | Wang et al. |
| 2017/0291246 A1 | 10/2017 | Sigler et al. |
| 2017/0291247 A1 | 10/2017 | Sigler et al. |
| 2017/0291248 A1 | 10/2017 | Sigler et al. |
| 2017/0297134 A1 | 10/2017 | Sigler et al. |
| 2017/0297135 A1 | 10/2017 | Sigler et al. |
| 2017/0297136 A1 | 10/2017 | Brown et al. |
| 2017/0297137 A1 | 10/2017 | Perry et al. |
| 2017/0297138 A1 | 10/2017 | Sigler et al. |
| 2017/0304925 A1 | 10/2017 | Sigler et al. |
| 2017/0304928 A1 | 10/2017 | Sigler et al. |
| 2017/0361392 A1 | 12/2017 | Sigler et al. |
| 2018/0071856 A1 | 3/2018 | Karagoulis et al. |
| 2018/0257166 A1 | 9/2018 | Sigler et al. |
| 2018/0272457 A1 | 9/2018 | Yang et al. |

OTHER PUBLICATIONS

Research Disclosure, "Capacitive Discharge Ring-Spot-Welded Final Drive Differential Carriers," Jan. 4, 2018.

U.S. Appl. No. 15/807,219, filed Nov. 8, 2017 by GM Global Technology Operations LLC, titled "Electrode Weld Face Design.".

U.S. Appl. No. 15/907,996, filed Feb. 28, 2018 by GM Global Technology Operations LLC, titled "Improving Mechanical Performance of Al-Steel Welds by Limiting Steel Sheet Deformation.".

U.S. Appl. No. 15/920,784, filed Mar. 14, 2018 by GM Global Technology Operations LLC, titled "Resistance Spot Welding Workpiece Stack-Ups Having a Steel Workpiece and an Aluminum Workpiece with a Steel Plate.".

U.S. Appl. No. 15/986,165, filed May 22, 2018 by GM Global Technology Operations LLC, titled "Overlapping Spot Welds for Improved Mechanical Performance and Weld Repair.".

U.S. Appl. No. 16/181,809, filed Nov. 6, 2018 by GM Global Technology Operations LLC, titled" Welding Electrode Design ".

U.S. Appl. No. 16/212,147, filed Dec. 6, 2018 by GM Global Technology Operations LLC, titled "Aluminum Alloy to Steel Welding Process.".

* cited by examiner

HIGH STRENGTH JOINTS BETWEEN STEEL AND TITANIUM

TECHNICAL FIELD

The technical field of this disclosure relates generally to welding of steel and titanium.

INTRODUCTION

Light-weighting of vehicles has been an important initiative for vehicle manufacturers to meet increasingly stringent emissions requirements. One way to reduce weight while maintaining desired strength could include producing certain components from titanium. While titanium may be desirable for certain components, it would not necessarily be desirable for every component. Accordingly, if titanium components are to be used in automobiles, they must be attached to non-titanium components. However, joining of titanium to other material through welding has proven to be difficult and ineffective. This is because brittle intermetallic phases are formed at the bonding interface, especially when attempting to weld titanium to steel. The result is both hot and cold cracking at the weld interface and a breaking apart of the components.

These challenges make producing strong joints between titanium and steel components difficult, or even impossible. Accordingly, advances in joining techniques between titanium and steel are desirable.

SUMMARY

The present disclosure provides a way to soundly weld titanium parts to steel parts, which is particularly useful in automotive applications, such as joining a titanium differential carrier case to a steel gear without any filler material disposed between them. Grooves may be formed into the faying surface of the steel (or the titanium) to provide greater current density on the steel side, resulting in a titanium-steel weld joint that fuses the materials together without excessively forming brittle intermetallic materials. Any undesirable intermetallics may be squeezed out during the welding process. The faying surfaces of the steel and aluminum parts may also be disposed along an angle with respect to the welding pressure axis or the axes of the parts, which also reduces the formation of intermetallic materials at the interface during a resistance welding process.

In one form, which may be combined with or separate from the other forms disclosed herein, a method of joining dissimilar materials is provided that includes providing first and second parts, where the second part has a faying surface defining a plurality of grooves therein, and the plurality of grooves is separated by a plurality of raised portions. One of the first and second parts is formed of a majority of titanium, and the other of the first and second parts is formed of a majority of iron. The method also includes providing a set of opposed welding electrodes, the set of opposed welding electrodes including a first electrode and a second electrode. The first electrode is disposed on a side of the first part, and the second electrode is disposed on a side of the second part. The method further includes applying pressure to the first and second parts via the set of electrodes and heating the first and second parts via the electrodes to form a joint between the first and second parts.

In another form, which may be combined with or separate from the other forms disclosed herein, a bonded assembly is provided that includes a first part formed of a majority of titanium and a second part formed of a steel alloy. The first and second parts form a bond that includes a portion of the first part directly in contact with and attached to a portion of the second part. The first and second parts are bonded without the use of mechanical interlocking, fasteners, or adhesive materials.

In yet another form, which may be combined with or separate from the other forms disclosed herein, a differential assembly is provided that includes a carrier case formed of a majority of titanium and a gear formed of a steel alloy. The carrier case is attached to the gear through a plurality of bonds. Each bond includes a portion of the carrier case directly in contact with and attached to a portion of the gear.

Additional features may optionally be provided, including but not limited to the following: each raised portion having an initial height prior to the step of applying pressure; the step of applying pressure including at least partially compressing the plurality of raised portions to a finished height that is less than the initial height; wherein heating the first and second parts via the electrodes includes employing a capacitive discharge welding process; providing the first part as a carrier case formed of a majority of titanium and providing the second part as a steel gear; wherein applying pressure includes applying pressure in an axial direction along a pressure axis; the first part defining a faying surface, the faying surface being disposed at an angle with respect to the pressure axis, the angle being in the range of 10 degrees to 80 degrees; the faying surface of the first part contacting at least the raised portions of the faying surface of the second part; the steel gear defining a radial plane extending along a radius of the gear; the carrier case having a carrier faying surface extending at an angle between 10 and 80 degrees with respect to the radial plane; the gear faying surface of the gear contacting the carrier faying surface of the carrier case; the angle between the carrier faying surface and the radial plane being in the range of 30 to 60 degrees; the first part defining a stop surface that is generally perpendicular to the pressure axis; the second part defining a shoulder; pressing the stop surface against the shoulder during the step of applying pressure; the steel gear further defining a stop surface that is parallel to or coplanar with the radial plane; the carrier case comprising a shoulder; pressing the stop surface against the shoulder during the step of applying pressure; and mechanically roughening at least one of the faying surfaces to define an average two-dimensional surface roughness Ra between 4 and 25 microns.

The part that contains titanium may be formed of pure titanium or a titanium alloy, such as a titanium-containing material consisting essentially of: 0 to 8 weight percent aluminum; 0 to 8 weight percent vanadium; 0 to 4 weight percent molybdenum; 0 to 6 weight percent chromium; 0 to 7 weight percent niobium; 0 to 5 weight percent zirconium; 0 to 3 weight percent iron; and the balance titanium.

The part that contains steel may be formed of a steel alloy consisting essentially of: 0.15 to 0.30 weight percent carbon; 0.4 to 1.6 weight percent chromium; 0.4 to 1.80 weight percent manganese; 0 to 2.00 weight percent nickel; 0 to 0.6 weight percent molybdenum; 0 to 0.5 weight percent vanadium; 0 to 0.5 weight percent niobium; and the balance iron.

Further additional features may optionally include the following: the second part having an unbonded surface extending from the bond and being directly adjacent to the bond; the unbonded surface defining a plurality of grooves therein; the plurality of grooves being separated by a plurality of raised portions; the gear defining an axis of rotation which may extend through a center of the gear; a faying surface of the gear being disposed at an angle with respect to the axis of rotation; the angle being in the range of 10 degrees to 80 degrees; the angle being in the range of 30 to 60 degrees; the gear defining a stop surface that is perpendicular to the axis of rotation; the carrier case having conical portion extending from the shoulder; and the portion of the carrier case that is directly in contact with and attached to the portion of the gear including the conical portion of the carrier case.

The above and other advantages and features will become apparent to those skilled in the art from the following detailed description and accompanying drawings.

BRIEF DESCRIPTION OF THE DRAWINGS

The drawings described herein are for illustration purposes only and are not intended to limit the scope of the present disclosure in any way.

DETAILED DESCRIPTION

A method of resistance welding is disclosed that includes forming weld joints, or bonds, between titanium-based materials and steel. A resulting workpiece assembly is also disclosed, including a joined titanium differential carrier case and a steel gear. Providing grooves on a faying surface, as well as providing the faying surfaces at angles with respect to the axis through which pressure is applied by the welding electrodes, or at angles with respect to axes of the two parts being welded together, reduce brittle intermetallics at the faying interface and results in high strength titanium-steel joints.

Figure 1A:
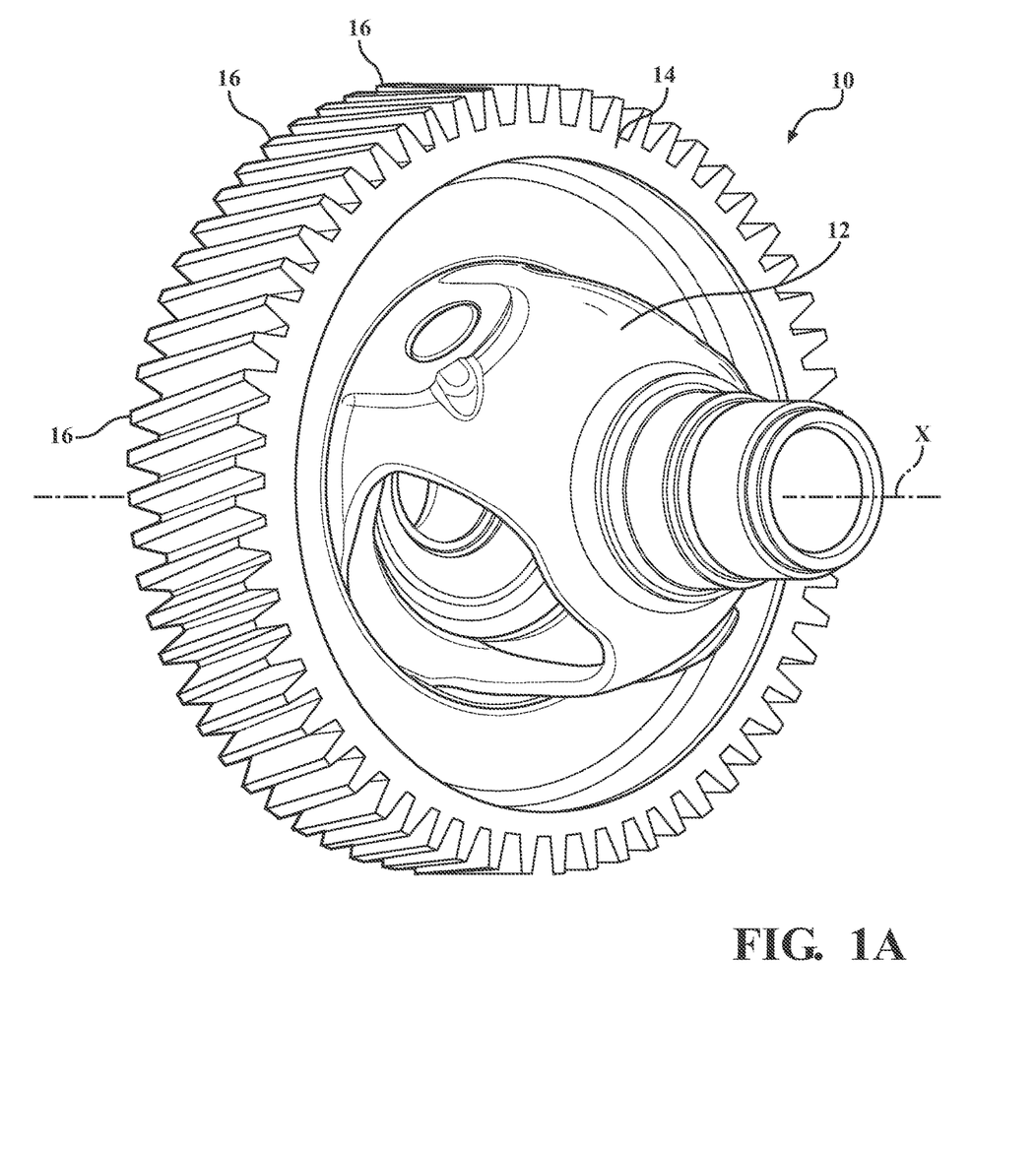
FIG. 1A is a perspective view of one side of a differential assembly including a carrier case and a gear, the carrier case and the gear bonded together through resistance welding bonds, in accordance with the principles of the present disclosure.
Figure 1B:
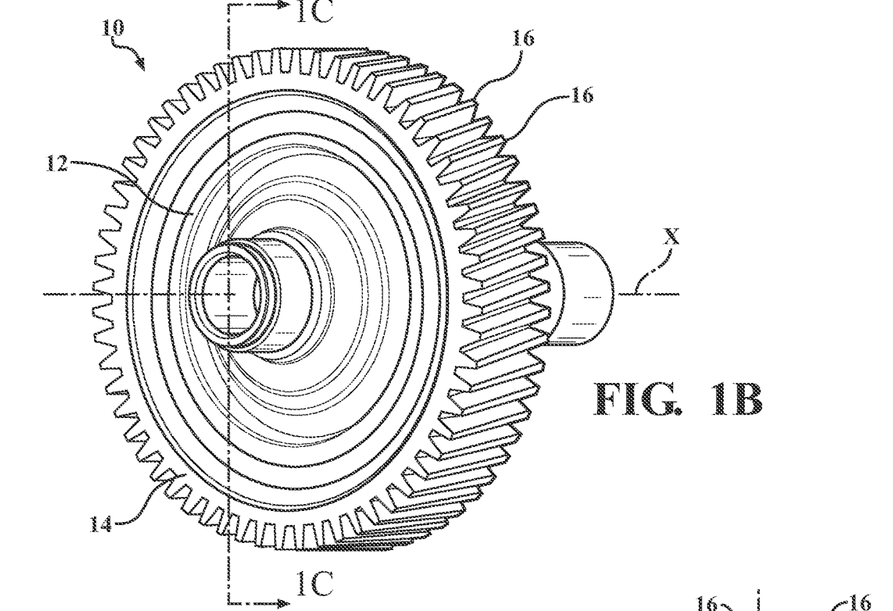
FIG. 1B is a perspective view of another side of the differential assembly of claim 1A, according to the principles of the present disclosure.
Figure 1C:
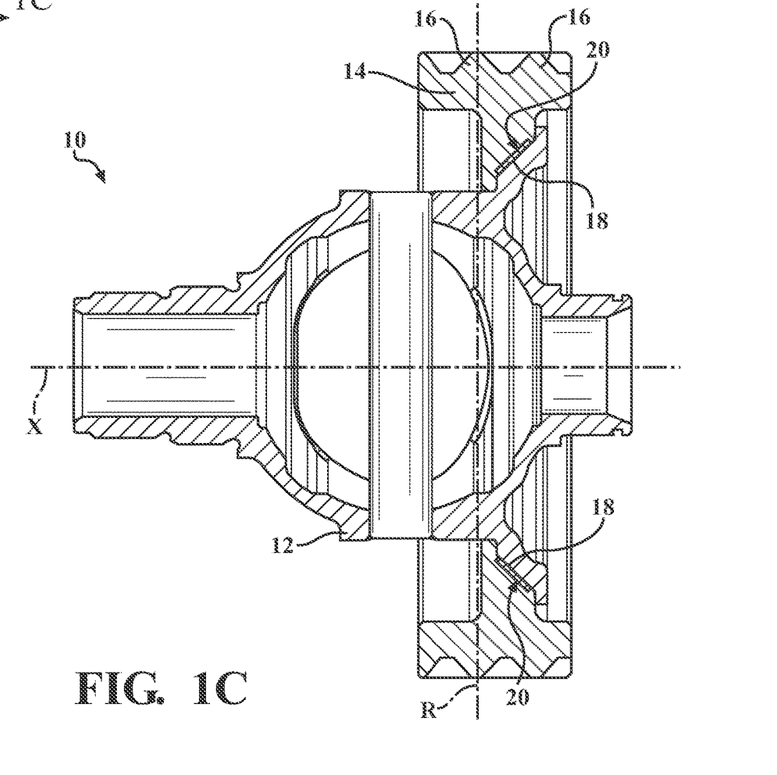
FIG. 1C is a cross-sectional view of the differential assembly of FIGS. 1A-1B, taken along the lines 1C-1C in FIG. 1B, in accordance with the principles of the present disclosure.
Figure 2A:
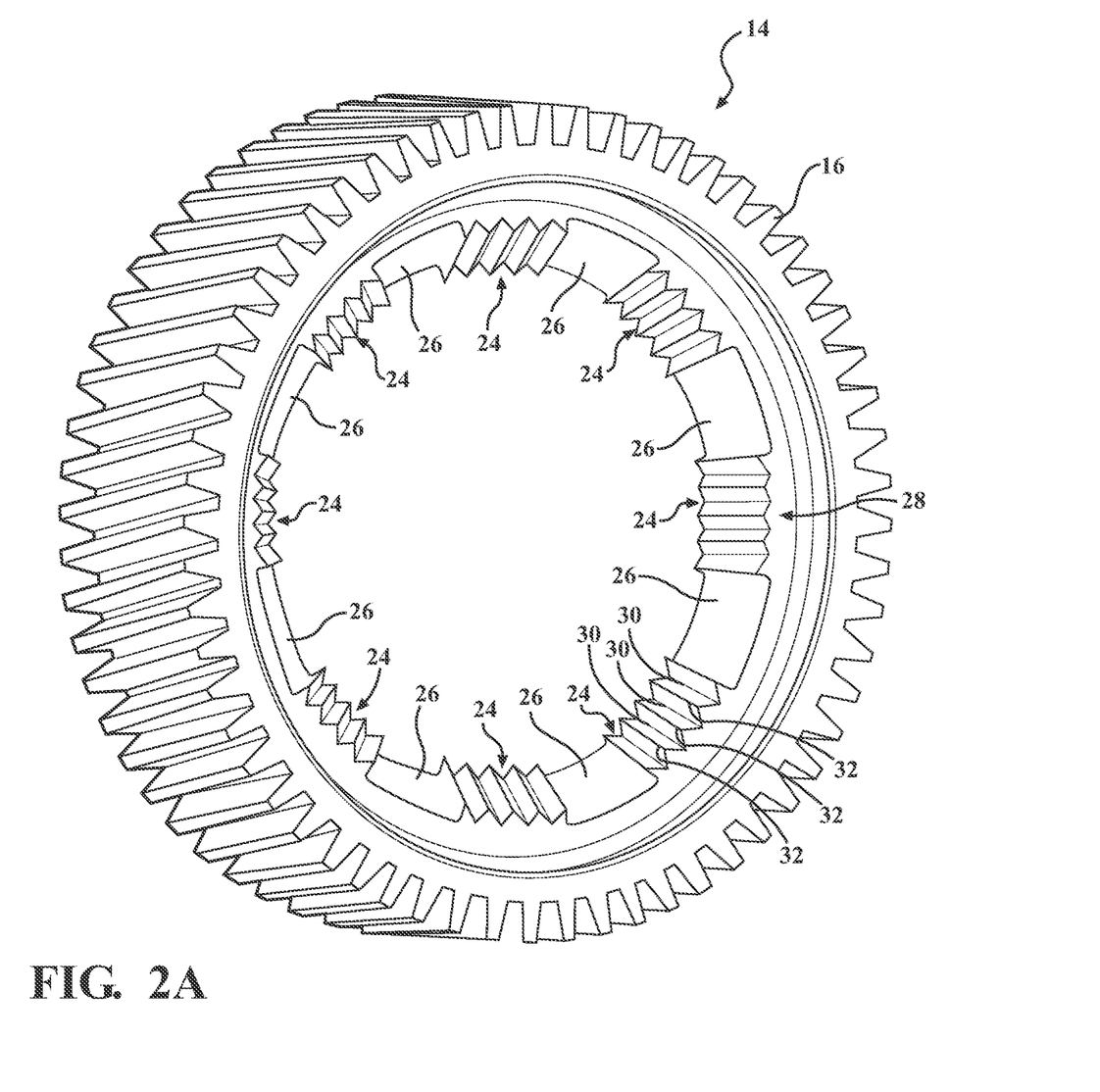
FIG. 2A is a perspective view of the gear of the differential assembly of FIGS. 1A-1C, prior to joining the gear to the carrier case, according to the principles of the present disclosure.
Figure 2B:
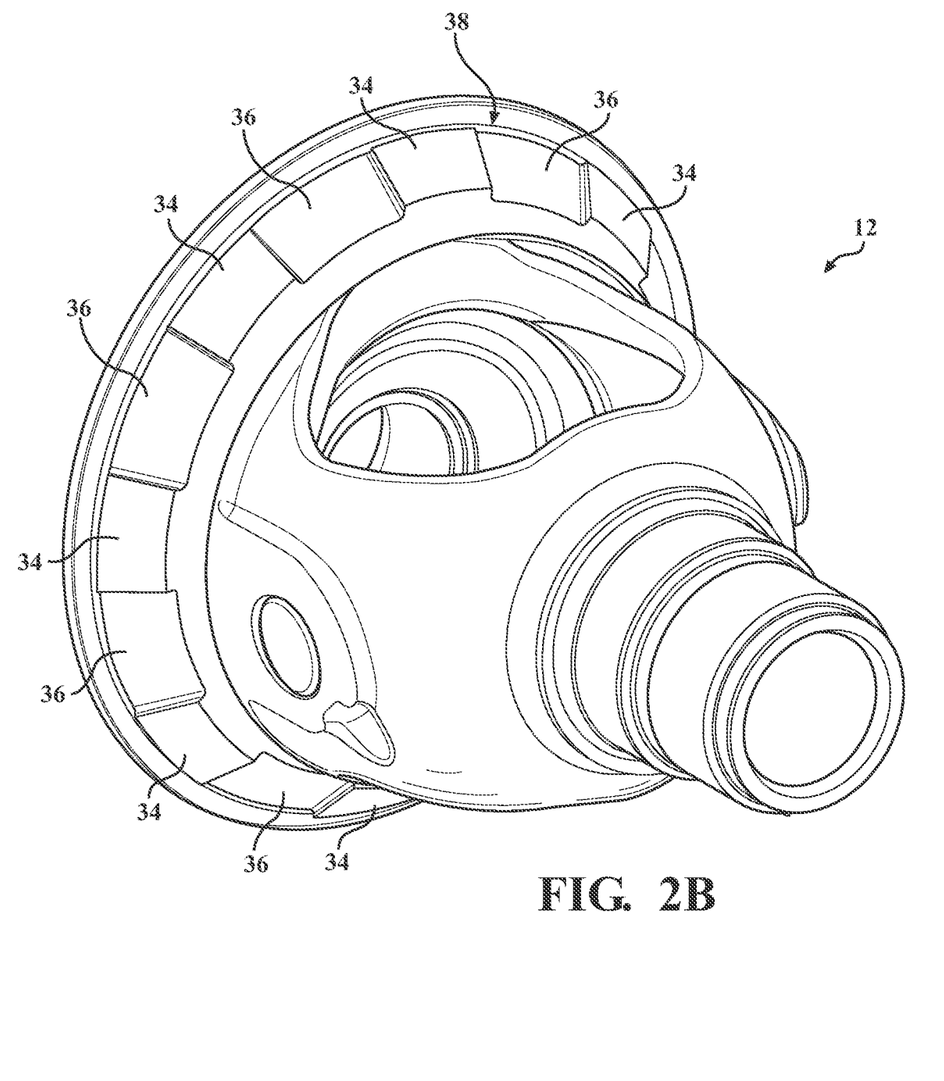
FIG. 2B is a perspective view of the carrier case of the differential assembly of FIGS. 1A-1C, prior to joining the carrier case to the gear, in accordance with the principles of the present disclosure.
Figures 2C, 2D:
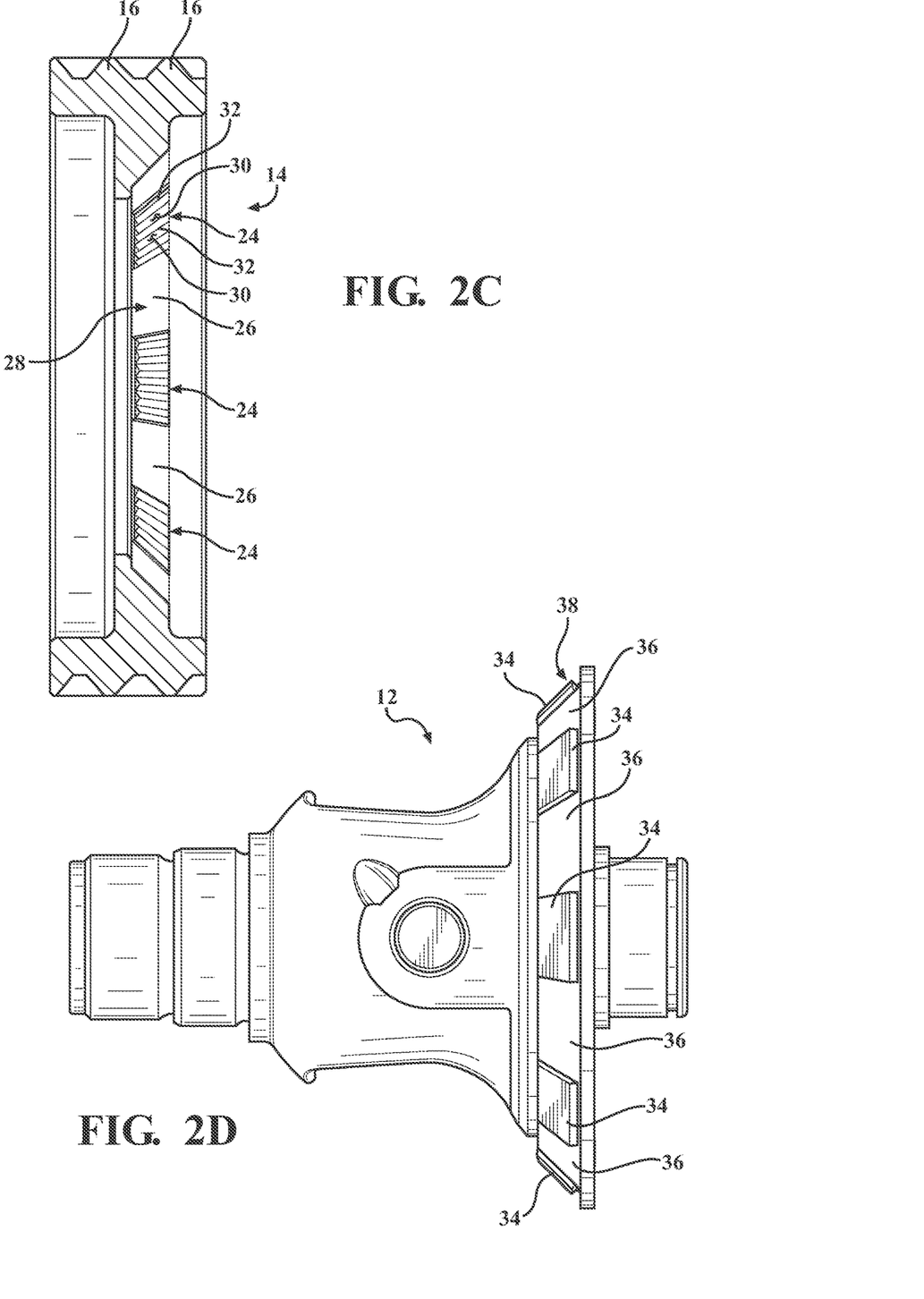
FIG. 2C is a side-cross sectional view of the gear of FIG. 2A, according to the principles of the present disclosure.
FIG. 2D is a side view of the carrier case of FIG. 2B, in accordance with the principles of the present disclosure.

Referring now to FIGS. 1A-1C, a welded assembly is provided and generally designated at 10. The welded assembly 10 includes a titanium (or titanium alloy) differential carrier case 12 welded to a steel gear 14 bearing a plurality of gear teeth 16 on an external surface thereof. A plurality of weld joints 18 join together the carrier case 12 and the gear 14 at a faying interface 20 between the carrier case 12 and the steel gear 14.

Referring now to FIGS. 2A-2D, the gear 14 and carrier case 12 are illustrated prior to being bonded together to form the differential assembly 10 shown in FIGS. 1A-1C. The steel gear 14 has a plurality of projecting portions 24 separated by valleys 26 about a generally conical inner surface 28 of the gear 14. Each projecting portion 24 defines a plurality of grooves 30 therein that are separated by a plurality of raised portions 32. The carrier case 12 also has its own projecting portions 34 that are separated by valleys 36 about a generally conical outer surface 38 of the carrier case 12.

Figures 3A, 3B:
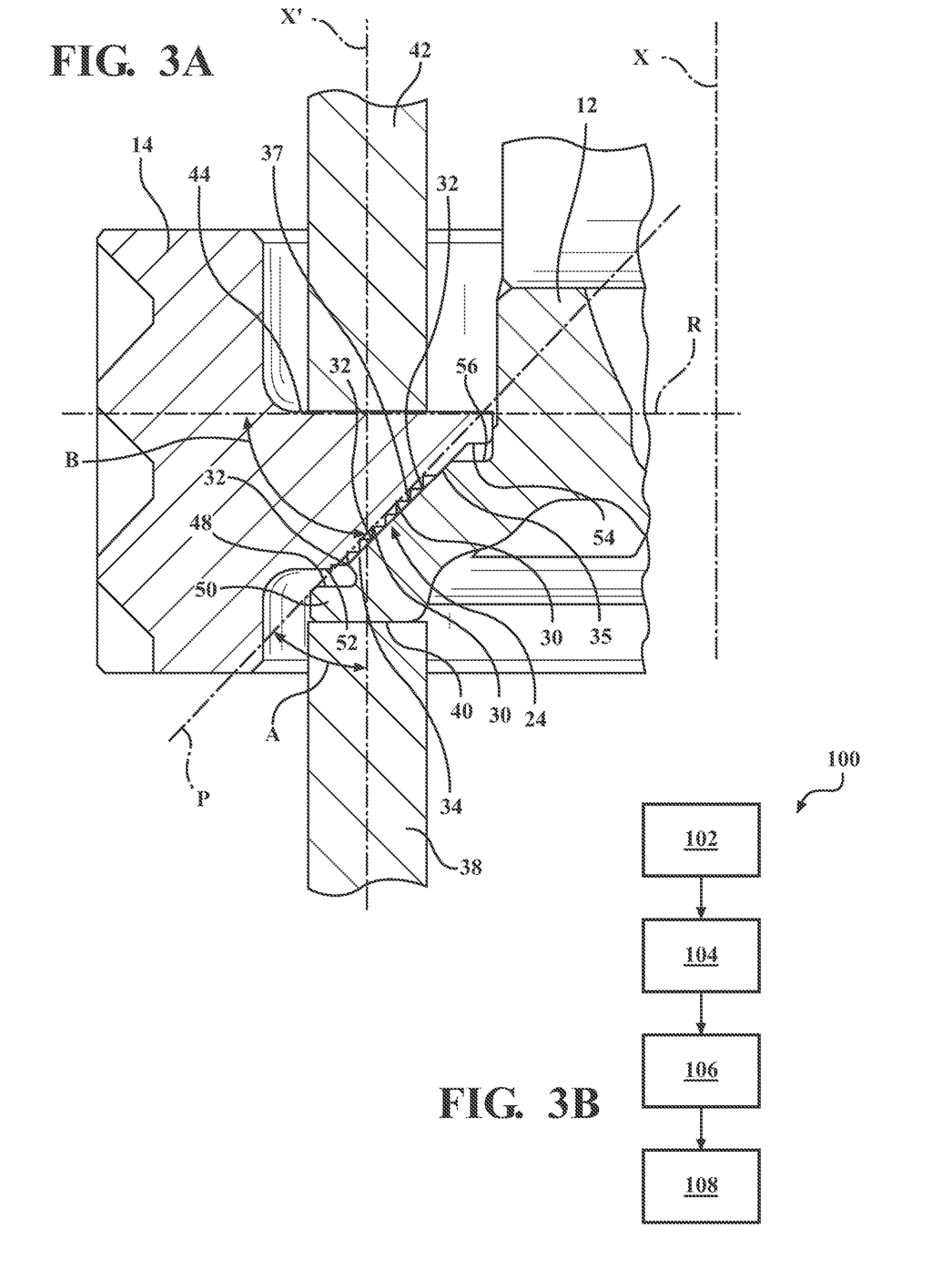
FIG. 3A is a cross-sectional view illustrating a portion of the gear and carrier case of FIGS. 1A-1C, with the gear and carrier case shown disposed adjacent to one another prior to performing a welding operation, and having a pair of electrodes disposed adjacent to the gear and carrier case, according to the principles of the present disclosure.
FIG. 3B is a block diagram illustrating a method of capacitive discharge resistance ring (CDRR) welding, which may be used to bond the differential assembly illustrated in FIGS. 1A-1C, in accordance with the principles of the present disclosure.

As shown in FIG. 3A, the projecting portions 24 of the gear 14 are aligned with the projecting portions 34 of the carrier case 12 to form the faying interface 20 between the carrier case 12 and the gear 14 for the welding operation used to join the carrier case 12 to the gear 14. The valleys 26, 36 are aligned with one another between the projecting portions 24, 34. The projecting portions 24, 34 each define faying surfaces 35, 37, respectively, that together define the faying interface 20. To perform the welding operation, a first electrode 38 is disposed adjacent to an electrode-facing surface 40 of the carrier case 12, and a second electrode 42 is disposed adjacent to an electrode-facing surface 44 of the steel gear 14.

Referring now to FIG. 3B, and with continued reference to FIG. 3A, the present disclosure provides a method 100 of joining dissimilar materials illustrated in a block diagram. The method 100 includes a step 102 of providing a first part, such as the carrier case 12. The method 100 further includes a step 104 of providing a second part, such as the gear 14, where the second part 14 has a faying surface 35 defining a plurality of grooves 30 therein, the plurality of grooves 30 is separated by a plurality of raised portions 32, and wherein one of the first and second parts 12, 14 is formed of a majority of titanium, and the other of the first and second parts 12, 14 is formed of a majority of iron.

The method 100 further includes a step 106 of providing a set of opposed welding electrodes, the set of opposed welding electrodes including a first electrode 38 and a second electrode 38, the first electrode 38 being disposed on a side 40 of the first part 12, and the second electrode 42 being disposed on a side 44 of the second part 14. The method 100 also includes a step 108 of applying pressure to the first and second parts 12, 14 via the set of electrodes 38, 42 and heating the first and second parts 12, 14 via the electrodes 38, 42 to form a joint between the first and second parts 12, 14.

Figure 4A:
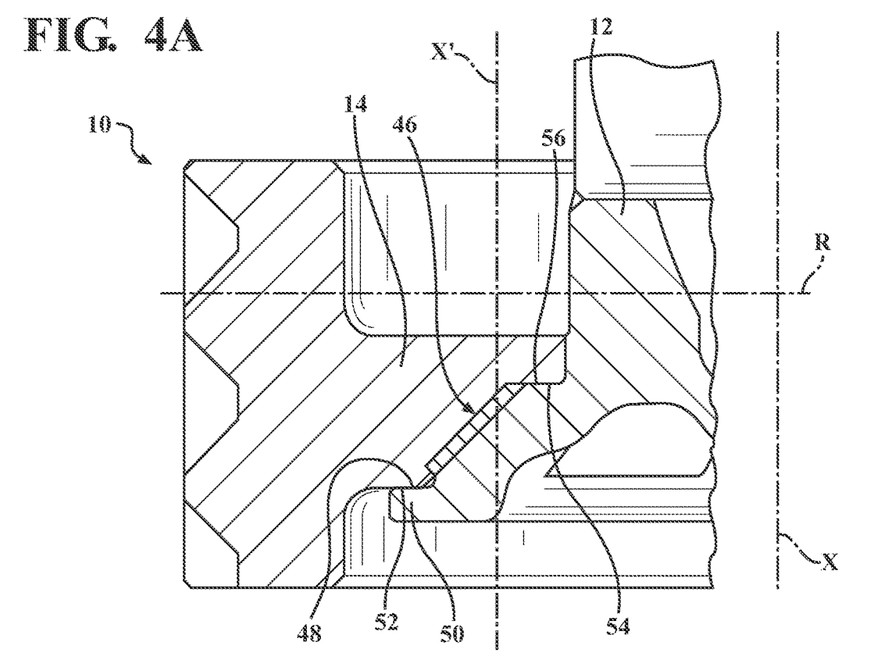
FIG. 4A is a cross-sectional view illustrating a portion of the gear and carrier case of FIGS. 1A-1C and 3A, with the gear and carrier case attached together by virtue of the welding operation of FIG. 3B, according to the principles of the present disclosure.

Referring to FIG. 4A, the welding operation causes the faying surfaces 35, 37 to melt together to form a weld joint 46, where the titanium of the carrier case 12 at least partially fills in the grooves 30 of the steel faying surface 35, and in many examples, the peaks 32 between the grooves 30 completely melt. Thus, the welding operation causes the raised portions 32 to decrease in size, and in some case, to completely melt into nonexistence. The joint 46 may contain both steel from the gear 14 and titanium from the carrier case 12.

The steel gear 14 defines an axis of rotation X, which is also an axis disposed along the center of the gear 14. In the illustrated example, the faying surface 35 of the steel gear 14 is disposed at an angle A with respect to the axis of rotation X and any axis X' that is parallel to the axis of rotation X. The angle A may be in the range of 10 degrees to 80 degrees, or in other examples, the angle A may be in the range of 30 degrees to 60 degrees. The faying surface 37 of the carrier case 12 is disposed in contact with and generally parallel to the faying surface 35 of the steel gear 14, and as such, the faying surface 37 of the carrier case 12 is also disposed at the angle A with respect to the axis of rotation X and the parallel axis X'. The faying surface 37 of the carrier case 12 contacts at least the raised portions 32 of the faying surface 35 of the gear 14.

The carrier case 12 may define a radial axis R that runs along a radius of the carrier case 12. The radial axis R of the carrier case 12 is perpendicular to the axis X of the gear 14. The carrier case faying surface 37 is disposed at an angle B with respect to the radial axis R. Since the gear faying surface 35 is disposed generally coplanar with and parallel to the faying surface 37 of the carrier case 12, the gear faying surface 35 is disposed at the angle B with respect to the radial axis R and any axis that is parallel to the radial axis R. The angle B may be in the range of 10 degrees to 80 degrees, or in some examples, the angle B may be in the range of 30 degrees to 60 degrees.

Prior to applying heat and pressure through the electrodes 38, 42 to secure the parts 12, 14 together in unity, the parts 12, 14 may be positioned and supported relative to one another by a fixturing device or devices to form the parts 12, 14 into overlapped workpieces upon which the welding operation will be performed. An intermediate organic material, such as a weld-through adhesive or a sealer, may optionally be included between the lapped workpieces in each stack-up if desired. Though the workpiece stack-up in this example comprises only the steel gear 14 and the carrier case 12, additional layers of metal or parts could be included in the workpiece stack-up. For example, the workpiece stack-up could alternatively include three, four, or more components upon which the electrodes 28, 42 act.

As described above, the steel gear 14 may be formed of steel and the carrier case 12 may be formed of unalloyed titanium or a titanium alloy, by way of example. For example, if alloyed, the titanium alloy may include at least a majority of titanium, and in some cases, at least 67 weight percent titanium. In one example, the carrier case 12 is formed of a titanium alloy consisting essentially of: 0 to 8 weight The steel gear 14 may be formed of any of a wide variety of strengths and grades and may be either coated or uncoated. The steel used may be hot-rolled or cold-rolled and may be composed of mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and/or boron steel such as when the steel includes press-hardened steel (PHS). If coated, the steel gear 14 may include a surface layer of zinc (e.g., hot-dip galvanized or electrogalvanized), a zinc-iron alloy (e.g., galvannealed or electrodeposited), a zinc-nickel alloy, nickel, aluminum, an aluminum-magnesium alloy, an aluminum-zinc alloy, or an aluminum-silicon alloy, any of which may have a thickness of up to 50 μm.

In one example, the gear 14 may be formed of a steel alloy consisting essentially of: 0.15 to 0.30 weight percent carbon, 0.4 to 1.6 weight percent chromium, 0.4 to 1.80 weight percent manganese, 0 to 2.00 weight percent nickel, 0 to 0.6 weight percent molybdenum, 0 to 0.5 weight percent vanadium, 0 to 0.5 weight percent niobium, and the balance iron.

In some variations, the steel gear 14 may be heat treated by carburization for better wear resistance. In such cases, the steel gear 14 may contain a greater amount of carbon at its surfaces, such as the faying surface 35, than at a center or other portions within the steel gear 14 inward from its outer surfaces. In some examples, the method 100 may be performed without decarburizing the faying surface 35 of the steel gear 14, because the grooves 30 and angles A, B provide for a good weld joint even without decarburization. The grooves 30 provide for concentrating of heat at the grooves 30 of the steel side, which reduce the formation of intermetallic materials at the joint 46. Angled faying surfaces 35, 37 also reduce the formation of intermetallics due to shear stresses of the angled surfaces 35, 37. Thus, the step 108 of applying pressure and heat to form the joint may be performed without decarburizing the steel alloy of the second part 14 because intermetallic formation may be reduced without the need for decarburization.

The electrodes 38, 42 may form a part of a weld gun that may be used to form welds between the carrier case 12 and the gear 14 to secure them together. As used herein, a "weld," "welded," or "welding" is used to refer to a resistance welding process of joining that involves heating adjacent workpieces by passing an electrical current to resistively heat adjacent workpieces until at least one of the workpieces melts at a faying interface to join the adjacent workpieces together. Similarly, the phrase "weld" is also used here as a generic term that encompasses the weld structure that fusion welds together overlapping aluminum workpieces or overlapping steel workpieces as well as a weld joint structure that weld bonds or brazes together an aluminum workpiece and an adjacent overlapping steel workpiece at each weld site where welding is performed.

The first and second welding electrodes 38, 42 may be mechanically and electrically coupled to the weld gun (not shown), which can support forming a rapid succession of ring or spot welds. The weld gun, for example, may be a C-type gun or an X-type gun, or some other type. The weld gun may be associated with a power supply or capacitor bank that delivers electrical current between the welding electrodes 38, 42 according to one or more programmed weld schedules administered by a weld controller. The weld gun may also be fitted with coolant lines and associated control equipment in order to deliver a cooling fluid, such as water, to each of the welding electrodes 38, 42 during welding operations to help manage the temperature of the electrodes 38, 42. The electrodes 38, 42 may be shaped as continuous or segmented rings, by way of example.

In terms of their positioning relative to the parts 12, 14, the first welding electrode 38 is positioned for contact with the side 40 of the carrier case 12, and the second welding electrode 42 is positioned for contact with the side 44 of the gear 14. In some examples, weld gun arms (not shown) are operable to converge or pinch the welding electrodes 38, 42 towards each other and to impose a clamping force on the workpiece stack-up formed by the parts 12, 14 at the weld site once the electrodes 38, 42 are brought into contact with their respective workpiece stack-up sides 40, 44. The electrodes 38, 42 communicate electrical current during each instance the weld gun is operated to conduct welding. The electrodes may have any type of desirable end, such as a ball nose, a multi-ring dome, surface texturing, or any other desired configuration. The weld gun (not shown) is operable to pass electrical current between the electrodes 38, 42 and through the parts 12, 14 at the weld site.

The exchanged electrical current may be a DC (direct current) electrical current that is delivered by a power supply (not shown) that electrically communicates with the first and second welding electrodes 38, 42. In some variations, a capacitive discharge welding method may be used, such that the welding energy released through the electrodes 38, 42 is provided through a large capacitor bank (not shown). As such, welding times may be short and concentrated. One or more pulses may be applied.

The step 108 of applying pressure may include applying pressure in an axial direction along a pressure axis, for example, the steel part axis X or any axis X' that is parallel to the part axis X. The carrier case 12 defines the faying surface 37 in a faying plane P, the faying plane P being disposed at the angle A with respect to the pressure axis X (which is the same axis as the axis of rotation X, in this example) and with respect to the parallel axis X'. As described above, the angle A is in the range of 10 degrees to 80 degrees, or more preferably, in the range of 30 to 60 degrees. Prior to welding, the faying surface 37 of the carrier case 12 contacts at least the raised portions 32 of the faying surface 35 of the gear 14. As described above, the carrier case 12 defines a radial plane or axis R extending along a radius of the carrier case 12, and the faying plane P is disposed at an angle B with respect to the radial plane or axis R. The angle B is also between 10 and 80 degrees, or in some variations, in the range of 30 to 60 degrees.

Disposing the faying interfaces 35, 37 at angles with respect to the pressure axis X allows the formation of intermetallic materials to be reduced due to shear stresses. When the formation of intermetallic materials is reduced, the weld joint is stronger because the intermetallics cause brittleness.

The carrier case 12 defines a stop surface 48 that is generally perpendicular to the pressure axis X. The stop surface 48 may be defined on a tab 50 extending from the carrier case 12. The gear 14 defines a shoulder 52. The method 100 of joining the parts 12, 14 may include pressing the stop surface 48 against the shoulder 52 during the step 106 of applying pressure, so that the stop surface 48 rests against the shoulder 52 when the parts 12, 14 are joined together. During the joining process, pressure is applied along the pressure X and intermetallics are squeezed out of the faying interface 20, and the stop surface 48 and shoulder 52 prevent the parts 12, 14 from sliding past one another when pressure is applied. To provide further support, the gear 14 may also define a stop surface 54 that is parallel to or coplanar with the radial plane or radial axis R and the carrier case 12 may include a shoulder 56. The method 100 may further include pressing the stop surface 54 against the shoulder 56 during the step 106 of applying pressure. Thus, when the parts 12, 14 are joined together, as shown in FIG. 4A, the shoulder 56 of the carrier case 12 rests against the stop surface 54 of the gear 14.

To further provide a strong weld joint 46 between the gear 14 and the carrier case 12, at least one of the faying surfaces 35, 37 may be mechanically roughened to define an average two-dimensional surface roughness Ra between 4 and 25 microns in the faying interface(s) 35, 37.

Figure 4B:
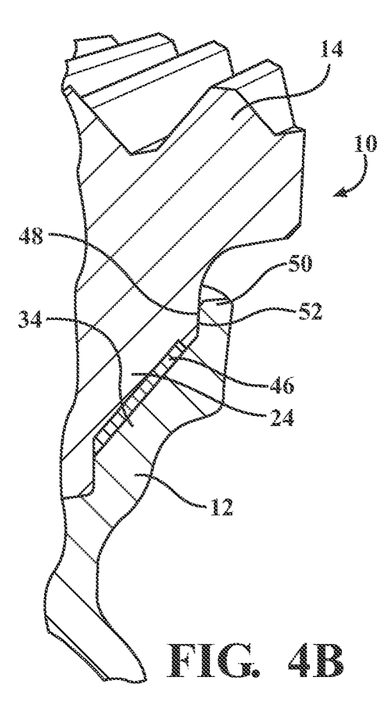
FIG. 4B is a cut-away perspective view of a portion of the bonded together gear and carrier case of FIGS. 1A-1C and 4A, in accordance with the principles of the present disclosure.
Figure 4C:
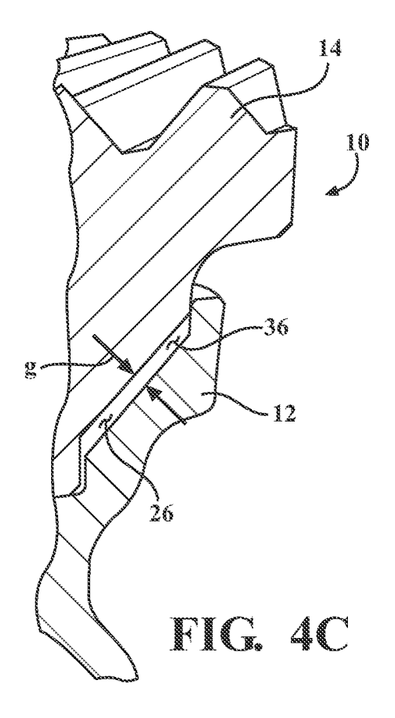
FIG. 4C is a cut-away perspective view of another portion of the bonded together gear and carrier case of FIGS. 1A-1C and 4A-4B, according to the principles of the present disclosure.

Referring now to FIGS. 4B and 4C, a cut-away perspective view of the bonded assembly 10 is illustrated. FIG. 4B shows a portion of the assembly 10 that has projecting portions 24, 26 of the gear 14 and carrier case 12 welded together to the form a joint 46. FIG. 4C shows the valleys 34, 36 of each of the gear 14 and carrier case 12 aligned together and not forming a joint 46 because the valleys 34, 36 form gaps g between the gear 14 and the carrier case 12. Thus, along the inner conical surface 28 of the gear 14 and the outer conical surface 38 of the carrier case 12, there are alternating joints 46 and gaps g formed by the valleys 26, 36.

Figure 5:
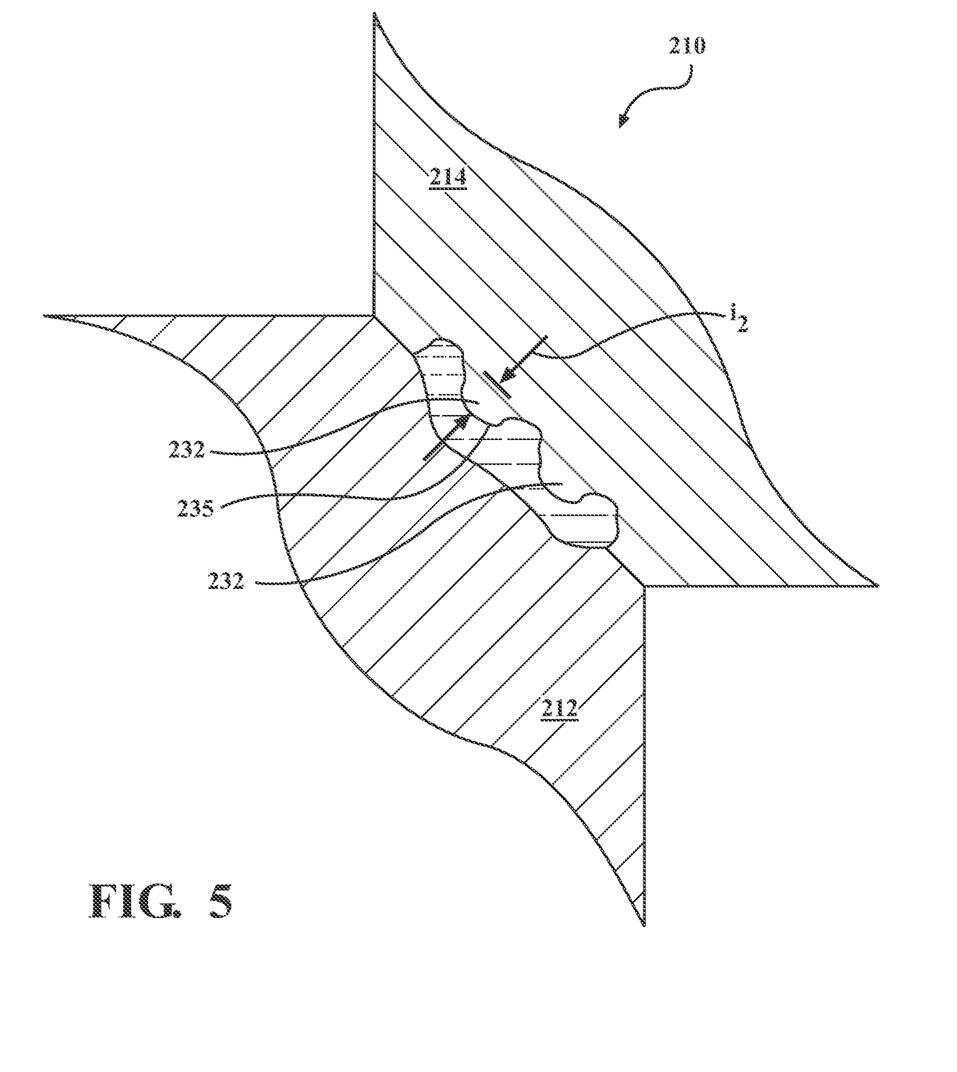
FIG. 5 is a cross-sectional view of another variation of a bonded together gear and carrier case, in accordance with the principles of the present disclosure.

Referring now to FIG. 5, another variation of a differential assembly 210 is illustrated that includes a carrier case 212 and a gear 214. In all respects, the differential assembly 210 may be the same as the differential assembly 10 shown and described above, except that in this differential assembly 210, the raised portions 232 on the faying surface 235 of the gear 214 did not completely melt away upon application of the heat through the electrodes. As such, each raised portion 232 has a finished height $i_2$ that is less than the initial height that the raised portions 232 had prior to performing the welding operation. The finished height $i_2$ may be 70% of the initial height, or the finished height $i_2$ may be less than 70% of the initial height.

The detailed description and the drawings or figures are supportive and descriptive of the many aspects of the present disclosure. The elements described herein may be combined or swapped between the various examples. While certain aspects have been described in detail, various alternative aspects exist for practicing the invention as defined in the appended claims. The present disclosure is exemplary only, and the invention is defined solely by the appended claims.

What is claimed is:

1. A method of joining dissimilar materials, the method comprising:
   providing a first part;
   providing a second part, the second part having a faying surface defining a plurality of grooves therein, wherein the plurality of grooves is separated by a plurality of raised portions, wherein one of the first and second parts is formed of a majority by weight of titanium, and the other of the first and second parts is formed of a majority by weight of iron;
   providing a set of opposed welding electrodes, the set of opposed welding electrodes including a first electrode and a second electrode, the first electrode being disposed on a side of the first part, and the second electrode being disposed on a side of the second part;
   applying pressure to the first and second parts via the set of electrodes and heating the first and second parts via the electrodes to form a joint between the first and second parts.

2. The method of claim 1, each raised portion having an initial height prior to the step of applying pressure, the step of applying pressure including at least partially compressing the plurality of raised portions to a finished height that is less than the initial height.

3. The method of claim 1, wherein the step of heating the first and second parts via the electrodes includes employing a capacitive discharge welding process.

4. The method of claim 1, further comprising providing the first part as a carrier case formed of a majority by weight of titanium and providing the second part as a steel gear.

5. The method of claim 1, wherein the step of applying pressure comprises applying pressure in an axial direction along a pressure axis, the first part defining a faying surface, the faying surface being disposed at an angle with respect to the pressure axis, the angle being in the range of 10 degrees to 80 degrees, the faying surface of the first part contacting at least the raised portions of the faying surface of the second part.

6. The method of claim 4, the faying surface being a gear faying surface, the steel gear defining a radial plane extending along a radius of the gear, the carrier case having a carrier faying surface, the carrier faying surface extending at an angle between 10 and 80 degrees with respect to the radial plane, the carrier faying surface contacting at least the raised portions of the carrier faying surface.

7. The method of claim 6, the angle between the carrier faying surface and the radial plane being in the range of 30 to 60 degrees.

8. The method of claim 5, the first part defining a stop surface that is generally perpendicular to the pressure axis, the second part defining a shoulder, the method further comprising pressing the stop surface against the shoulder during the step of applying pressure.

9. The method of claim 6, the steel gear further defining a stop surface that is parallel to or coplanar with the radial plane, the carrier case comprising a shoulder, the method further comprising pressing the stop surface against the shoulder during the step of applying pressure.

10. The method of claim 5, further comprising mechanically roughening at least one of the faying surfaces to define an average two-dimensional surface roughness Ra between 4 and 25 microns.

11. The method of claim 5, further comprising forming the first part of a titanium-containing material consisting essentially of:
0 to 8 weight percent aluminum;
0 to 8 weight percent vanadium;
0 to 4 weight percent molybdenum;
0 to 6 weight percent chromium;
0 to 7 weight percent niobium;
0 to 5 weight percent zirconium;
0 to 3 weight percent iron; and
the balance titanium.

12. The method of claim 11, further comprising forming the second part of a steel alloy consisting essentially of:
0.15 to 0.30 weight percent carbon;
0.4 to 1.6 weight percent chromium;
0.4 to 1.80 weight percent manganese;
0 to 2.00 weight percent nickel;
0 to 0.6 weight percent molybdenum;
0 to 0.5 weight percent vanadium;
0 to 0.5 weight percent niobium; and
the balance iron.

* * * * *